United States Patent [19]

Dumbaugh, Jr. et al.

[11] Patent Number: 4,483,931
[45] Date of Patent: Nov. 20, 1984

[54] LEAD GALLATE GLASSES

[75] Inventors: William H. Dumbaugh, Jr., Painted Post; Brian P. Tyndell, Beaver Dams, both of N.Y.

[73] Assignee: Corning Glass Works, Corning, N.Y.

[21] Appl. No.: 476,929

[22] Filed: Mar. 21, 1983

[51] Int. Cl.³ .............................................. C03C 3/12
[52] U.S. Cl. ....................... 501/41; 501/22; 501/30; 501/42; 501/43; 501/74; 501/901; 501/904
[58] Field of Search ............... 501/41, 74, 904, 901, 501/22, 42, 43; 430/84

[56] References Cited

U.S. PATENT DOCUMENTS

| | | | |
|---|---|---|---|
| 2,853,393 | 9/1958 | Beck | 501/41 |
| 3,188,216 | 6/1965 | Burton et al. | 501/904 |
| 3,507,646 | 4/1970 | Wood et al. | 501/42 |
| 3,531,271 | 9/1970 | Dumbaugh | 501/43 |
| 3,607,388 | 9/1971 | Hori et al. | 430/84 |
| 3,723,141 | 3/1973 | Dumbaugh | 501/42 |
| 3,837,868 | 9/1974 | Berleue et al. | 501/41 |
| 3,947,089 | 3/1976 | Rapp | 501/42 |
| 4,407,061 | 10/1983 | Grodkiewicz et al. | 501/22 |

FOREIGN PATENT DOCUMENTS 158896 2/1983 German Democratic Rep. ................................ 501/901

OTHER PUBLICATIONS

Kantor, P. et al., "Preparation of Iron Sesquioxide Glasses by Ultra-Fast Quenching from the Melt", J. Mat. Sci. 8 (1973), pp. 1359-1361.

Primary Examiner—Helen M. McCarthy
Attorney, Agent, or Firm—C. S. Janes, Jr.

[57] ABSTRACT

This invention is directed to the preparation of glasses in the $PbO$—$Ga_2O_3$ field exhibiting good infrared transmitting characteristics out to wavelengths of 8 microns. The binary glasses consist essentially, by weight, of about 15-28% $Ga_2O_3$ and 72-85% $PbO$. However, the preferred glasses contain up to 85% $Bi_2O_3$ and consist essentially as included within the area generally encompassed by the curve in FIG. 2.

4 Claims, 2 Drawing Figures

LEAD GALLATE GLASSES

BACKGROUND OF THE INVENTION

Glasses demonstrating relatively high transmission in the infrared region of the radiation spectrum are well known in the art. One rather large use of such glasses has been as elements in the construction of commercial detection systems based upon sensitivity to heat or infrared radiation.

U.S. Pat. No. 3,723,141 provides a brief review of the prior art directed to glass compositions asserted to exhibit good infrared transmission. In general, those prior art glasses had displayed good transmittances to wavelengths no longer than six microns and, commonly, no greater than five microns. The patent described glass compositions in the lead bismuthate system capable of transmitting substantial amounts of infrared radiation at wavelengths longer than six microns. Those glasses consisted essentially, expressed in terms of weight percent on the oxide basis, of PbO: 10-75
$Bi_2O_3$: 10-85
PbO+$Bi_2O_3$: at least 60
BaO: 2-25
ZnO: 1-10
$SiO_2+B_2O_3+P_2O_5$: <1

Optionally, up to 10% individually and up to 20% collectively of the following oxides may also be present: $As_2O_3$, CaO, CdO, $GeO_2$, HgO, $Sb_2O_3$, SrO, $TiO_2$, $Tl_2O_3$, the alkali metal oxides, and the colorant or transition metal oxides. A drawing appended to the patent, wherein percent transmission is plotted against transmitting wavelengths, indicated a transmittance of at least 50% at a wavelength of 7.5 microns, but a rapid loss of transmission at longer wavelengths.

U.S. Pat. No. 3,837,868 is asserted to be an improvement upon the glasses of U.S. Pat. No. 3,723,141, wherein those latter glasses were stabilized to better avoid devitrification through the inclusion of $Fe_2O_3$. Those glasses consisted essentially, expressed in terms of cation percent on the oxide basis, of $Bi_2O_3$: 8-80
PbO: 0-57
CdO: 0-32
PbO+CdO: at least 5%
$Fe_2O_3$: 5-32.5

Optionally, up to 15% total of compatible glassmaking constituents may also be present including up to 7.5% BaO and/or ZnO, up to 5% $GeO_2$, $V_2O_5$, NiO, CoO, and other transition metal oxides, and up to 2% $B_2O_3$+$SiO_2$.

Rather than repeating the reviews of prior art supplied in those patents, the full disclosures of those patents are explicitly incorporated herein by reference.

SUMMARY OF THE INVENTION

We have discovered a region of glass compositions in the base PbO—$Ga_2O_3$ system, to which $Bi_2O_3$ is preferably included, which can transmit substantial infrared radiation to a wavelength of 8 microns and can exhibit refractive indices greater than 2.4. Those glasses have base compositions consisting essentially, expressed in terms of weight percent on the oxide basis, of about 72-85% PbO and 15-28% $Ga_2O_3$. The inclusion of $Bi_2O_3$ greatly improves the stability of the glasses against devitrification and the melting and forming chracteristics thereof. The chemical durability of these compositions is very good for glasses exhibiting high indices of refraction and infrared transmissions. They demonstrate no weathering after several months' exposure to ambient environments and do not dissolve when immersed into water for extended periods at ambient conditions. Moreover, the addition of $Bi_2O_3$ dramatically broadens the scope of operable glass compositions. Thus, $Bi_2O_3$ may be incorporated into the glass composition in amounts up to 85% and, in so doing, provides glasses demonstrating the desired infrared transmitting character within the area generally encompassed by the curve depicted on the ternary diagram comprising FIG. 1. A somewhat rough approximation of the operable ternary compositions consists essentially of PbO: 10-85
$Ga_2O_3$: 5-30
$Bi_2O_3$: up to 85

The following compatible metal oxides in the indicated individual proportions and collectively in an amount not exceeding about 30% may also optionally be present to modify the chemical and physical properties of the glass without significantly altering the infrared radiation transmission capability thereof.

| | | | |
|---|---|---|---|
| $Cs_2O$ | 0-20 | $Rb_2O$ | 0-5 |
| HgO | 0-30 | $HfO_2$ | 0-5 |
| $Tl_2O_3$ | 0-20 | $Al_2O_3$ | 0-3 |
| $Sb_2O_3$ | 0-10 | ZnO | 0-5 |
| $TeO_2$ | 0-10 | $K_2O$ | 0-2 |
| $Cr_2O_3$ | 0-5 | $In_2O_3$ | 0-10 |
| $MnO_2$ | 0-5 | $SiO_2$ | 0-2 |
| CuO | 0-2 | $ZrO_2$ | 0-5 |
| CdO | 0-12 | $Nb_2O_5$ | 0-5 |
| $GeO_2$ | 0-5 | $Ta_2O_5$ | 0-5 |
| $Na_2O$ | 0-2 | | |

The inclusion of a halogen in an amount up to about 5% is useful in removing water from the glass and thereby eliminating the strong absorption in the infrared region of the radiation spectrum at about three microns which is characteristic of water in glass. Chlorine appears to be the most effective of the halogens in this regard. The application of a halogen to reduce the water content of a glass is disclosed in U.S. Pat. Nos. 3,531,271 and 3,531,306.

PRIOR ART

*Inorganic Glass-Forming Systems*, H. Rawson, Academic Press, London and New York, 1967, pages 200-1, furnishes a summary of glass compositions in the CaO-$Ga_2O_3$ system. Increased glass stability was achieved through the addition of a few percent of $SiO_2$.

P. Kantor, A. Revcolevschi, and R. Collongues, "Preparation of Iron Sesquioxide Glasses by Ultra-Fast Quenching from the Melt ("splat cooling")", *Journal of Materials Science*, 8, pages 1359-61 (1973) describes the formation of glass bodies of very small size dimensions through splat cooling, i.e., essentially instantaneous cooling. Thus, the products consisted of flakes and/or thin films. The publication was concerned principally with compositions in the $Fe_2O_3$—BaO, FeO—CaO, and $Fe_2O_3$—PbO systems, but glasses containing about 40-95 mole percent PbO and 5-60 mole percent $Ga_2O_3$ (44.3-95.8 weight percent PbO and 4.2-55.7 weight percent $Ga_2O_3$) were noted. Such ranges extend far beyond the 72-85% PbO/15-28% $Ga_2O_3$ regions of the present inventive glasses, the latter ranges providing commercially practical glassmaking compositions.

Moreover, no physical property data were supplied by the authors so no indication was furnished of the very high indices of refraction and transmission in the infrared portion of the radiation spectrum which are exhibited by the present inventive glasses.

U.S. Pat. No. 3,188,216 is concerned with the preparation of glasses having base compositions within the SrO—Ga$_2$O$_3$ system which are capable of transmitting at least 15% of infrared radiation at a wavelength of 6.5 microns. The glasses consist essentially of at least 50% by weight of SrO and Ga$_2$O$_3$ in the ratio of 0.66–1.13 parts of Ga$_2$O$_3$ to one part of SrO and optionally contain up to 45% PbO, up to 35% of at least one oxide selected from the group of Li$_2$O, Na$_2$O, K$_2$O, CaO, and MgO, and up to 40% of at least one oxide selected from the group of CdO, CuO, ZnO, La$_2$O$_3$, TiO$_2$, ZrO$_2$, ThO$_2$, GeO$_2$, Ta$_2$O$_5$, As$_2$O$_3$, and Sb$_2$O$_3$. Fluoride may replace part of the oxide.

U.S. Pat. No. 3,511,992 discusses the production of a glass consisting essentially of 35 atomic percent germanium, 60 atomic percent selenium, and 5 atomic percent gallium. The glass is stated to demonstrate good transmission in the 1–20 micron wavelength regime of the radiation spectrum.

U.S. Pat. No. 4,197,136 is drawn to glasses suitable for use in optical transmission lines. The glasses were composed principally of P$_2$O$_5$ and GeO$_2$, with Ga$_2$O$_3$ being added to dramatically improve their resistance to attack by water. The patented compositions consisted essentially, in weight percent, of 10–58% P$_2$O$_5$, 15–85% GeO$_2$, and 5–40% Ga$_2$O$_3$. No mention is made of the infrared transmission capabilities of the glasses.

U.S. Pat. No. 4,341,542 discloses a method for preparing glasses suitable for use in optical transmission bodies. The method involves precipitating an oxide of a glass forming element by the hydrolysis reaction of a halogen compound of said glass forming element in the liquid phase, adding phosphoric acid to the precipitate to produce phosphate, removing the water from the phosphate, and then firing the phosphate to vitrify it. Glasses useful in the process were asserted to consist essentially, in weight percent, of 45–55% P$_2$O$_5$, 20–35% Ga$_2$O$_3$, 10–25% GeO$_2$, and 0–10% SiO$_2$.

DESCRIPTION OF PREFERRED EMBODIMENTS

Table I reports a number of glass compositions, expressed in terms of approximate weight percent on the oxide basis, illustrating the parameters of the invention. PbO, Bi$_2$O$_3$, and Ga$_2$O$_3$ constituted the batch ingredients therefor, although it will be appreciated that other starting materials capable, upon being melted together, of being converted into the desired oxide in the proper proportion would be suitable. Because it is not known with which cation(s) the chloride is combined, it is merely recorded in terms of chloride, in accordance with conventional glass analysis practice. In the following example it was batched as lead chloride. Table IA lists the compositions expressed in terms of cationic percent.

Figure 2:
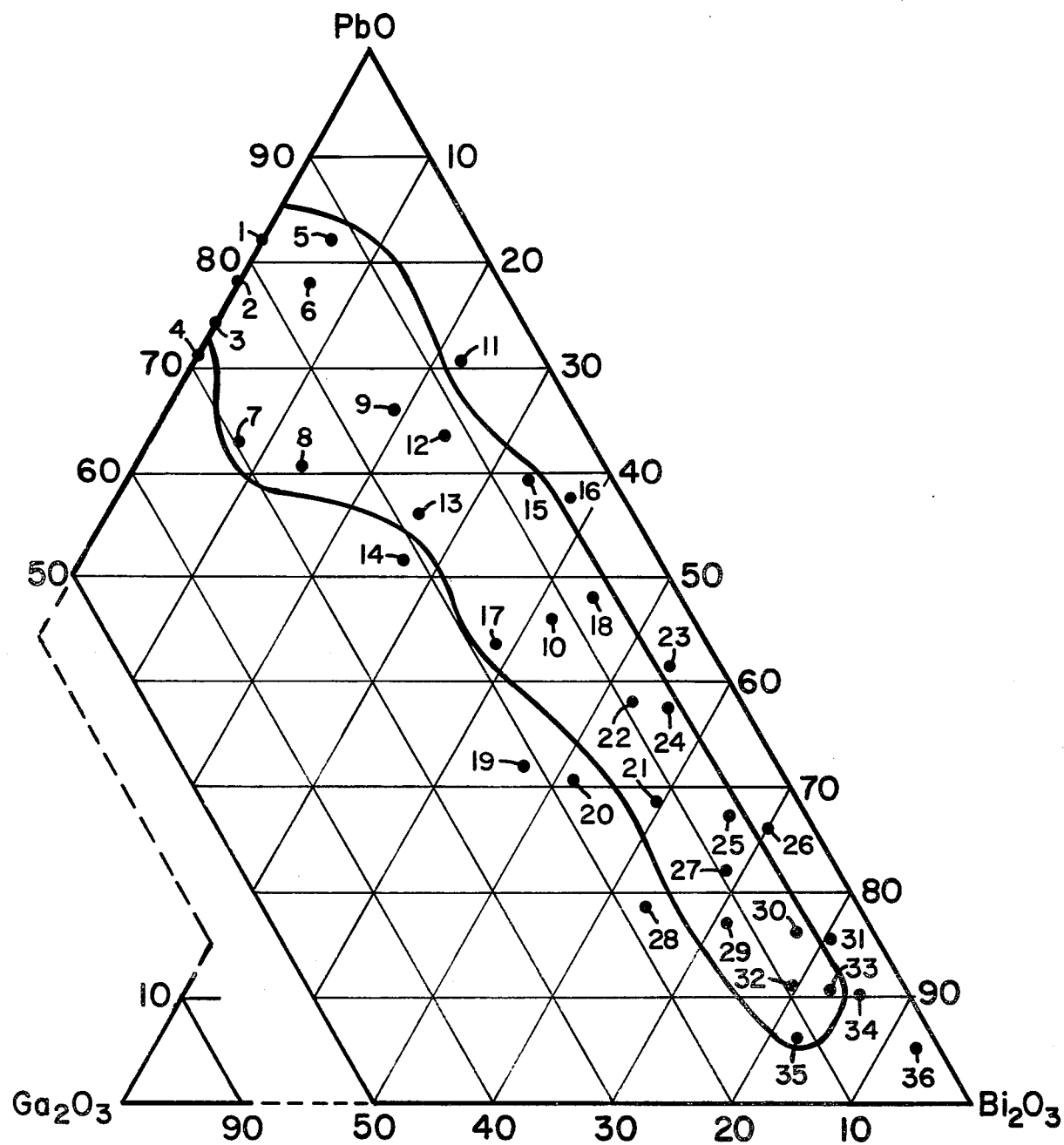
FIG. 2 is a ternary composition diagram of the PbO—Ga$_2$O$_3$—Bi$_2$O$_3$ system illustrating the basic area of glass compositions displaying the desired infrared transmitting capabilities.

The batch components were compounded in the appropriate amounts to yield 50 grams of glass, the batches ballmilled in a polypropylene jar using Al$_2$O$_3$ balls, the batches charged into platinum crucibles, and the crucibles introduced into a furnace operating at 1000° C. After 20 minutes, the melts were poured onto a steel plate and the resultant slabs allowed to cool to room temperature in the ambient environment. A visual description of glass quality is provided in Table I wherein "good" signifies essentially no unmelted batch or devitrification observed, "fair" indicates the inclusion of a minor amount of unmelted batch or devitrification, and "poor" designates the presence of less than 50% glass. Each exemplary composition is positioned in FIG. 2.

In Example 42 dry nitrogen was gently blown across the surface of the melt in order to sweep out the water vapor being volatilized off. Dry nitrogen is a very convenient gas for that purpose because, as supplied commercially, it is quite dry. Nevertheless, as is explained in U.S. Pat. No. 3,531,271, any gas may be utilized for that function so long as it is dry and is essentially inert to the molten glass. Air, helium, and oxygen are explicitly noted as being operable.

Removal of water from the molten glass can also be effected by bubbling a dry halogen-containing gas through the melt. Dry chlorine and dry HCl gases have been disclosed as useful for that purpose.

TABLE I

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PbO | 82 | 78 | 74 | 71 | 82 | 71.5 | 63.0 | 60.5 | 66 | 46 | 70.5 | 63.5 | 56 | 51.5 |
| Ga$_2$O$_3$ | 18 | 22 | 26 | 29 | 12 | 21.5 | 29.5 | 25.5 | 15 | 12 | 7.0 | 12.0 | 18 | 21.5 |
| Bi$_2$O$_3$ | — | — | — | — | 6 | 7 | 7.5 | 14.0 | 19 | 42 | 22.5 | 24.5 | 26 | 27.0 |
| Cs$_2$O | | | | | | | | | | | | | | |
| HgO | | | | | | | | | | | | | | |
| Tl$_2$O | | | | | | | | | | | | | | |
| In$_2$O$_3$ | | | | | | | | | | | | | | |
| Cl | | | | | | | | | | | | | | |
| Quality | Good | Good | Good | Poor | Fair | Good | Good | Good | Good | Good | Poor | Good | Good | Poor |

| | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| PbO | 59.5 | 57.5 | 43.5 | 48.0 | 32.0 | 30.5 | 28.5 | 38.5 | 41.5 | 37.5 | 27.0 | 26 | 22.0 | 18.5 |
| Ga$_2$O$_3$ | 7.0 | 4.5 | 18.0 | 7.5 | 21.5 | 18.0 | 12.0 | 9.5 | 4.5 | 6.5 | 6.5 | 4 | 9.5 | 18.0 |
| Bi$_2$O$_3$ | 33.5 | 38.0 | 38.5 | 44.5 | 46.5 | 51.5 | 59.5 | 52.0 | 54.0 | 56.0 | 66.5 | 70 | 68.5 | 63.5 |
| Cs$_2$O | | | | | | | | | | | | | | |
| HgO | | | | | | | | | | | | | | |
| Tl$_2$O | | | | | | | | | | | | | | |
| In$_2$O$_3$ | | | | | | | | | | | | | | |
| Cl | | | | | | | | | | | | | | |

TABLE I-continued

| Quality | Good | Poor | Good | Good | Poor | Poor | Good | Good | Poor | Good | Good | Poor | Good | Poor |
|---|---|---|---|---|---|---|---|---|---|---|---|---|---|---|
| | 29 | 30 | 31 | 32 | 33 | 34 | 35 | 36 | 37 | 38 | 39 | 40 | 41 | 42 |
| PbO | 17 | 16.0 | 15.5 | 11.0 | 10.5 | 10.0 | 6.0 | 5 | 40.1 | 37.6 | 34.4 | 37.7 | 26.2 | 45.3 |
| Ga$_2$O$_3$ | 12 | 6.5 | 4.0 | 9.5 | 6.5 | 4.5 | 11.5 | 2 | 10.5 | 9.9 | 9.0 | 9.9 | 15.6 | 11.9 |
| Bi$_2$O$_3$ | 71 | 77.5 | 80.5 | 79.5 | 83.0 | 85.5 | 82.5 | 93 | 36.7 | 34.3 | 31.5 | 34.5 | 50.1 | 41.4 |
| Cs$_2$O | | | | | | | | | 12.7 | — | — | — | — | — |
| HgO | | | | | | | | | — | 18.2 | 25.1 | — | — | — |
| Tl$_2$O | | | | | | | | | — | — | — | 17.9 | — | — |
| In$_2$O$_3$ | | | | | | | | | — | — | — | — | 8.1 | — |
| Cl | | | | | | | | | — | — | — | — | — | 1.4 |
| Quality | Good | Good | Poor | Good | Good | Poor | Fair | Poor | Good | Good | Good | Good | Good | Good |

TABLE IA

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| PbO | 65 | 60 | 55 | 50 | 70 | 55 | 45 | 45 | 55 | 40 | 65 | 55 | 45 | 40 |
| Ga$_2$O$_3$ | 35 | 40 | 45 | 50 | 25 | 40 | 50 | 45 | 30 | 25 | 25 | 25 | 35 | 40 |
| Bi$_2$O$_3$ | — | — | — | — | 5 | 5 | 5 | 10 | 15 | 35 | 20 | 20 | 20 | 20 |
| Cs$_2$O | | | | | | | | | | | | | | |
| HgO | | | | | | | | | | | | | | |
| Tl$_2$O | | | | | | | | | | | | | | |
| In$_2$O$_3$ | | | | | | | | | | | | | | |
| Cl | | | | | | | | | | | | | | |

| | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| PbO | 55 | 55 | 35 | 45 | 25 | 25 | 25 | 35 | 40 | 35 | 25 | 25 | 20 | 15 |
| Ga$_2$O$_3$ | 15 | 10 | 35 | 15 | 40 | 35 | 25 | 20 | 10 | 15 | 15 | 10 | 20 | 35 |
| Bi$_2$O$_3$ | 30 | 35 | 30 | 40 | 35 | 40 | 50 | 45 | 50 | 50 | 60 | 65 | 60 | 50 |

| | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| PbO | 15 | 15 | 15 | 10 | 10 | 10 | 5 | 5 | 33.3 | 33.3 | 30.8 | 33.3 | 21.1 | 39.983 |
| Ga$_2$O$_3$ | 25 | 15 | 10 | 20 | 15 | 10 | 25 | 5 | 21.8 | 21.8 | 19.2 | 21.8 | 29.8 | 24.990 |
| Bi$_2$O$_3$ | 60 | 70 | 75 | 70 | 75 | 80 | 70 | 90 | 29.2 | 29.2 | 26.9 | 29.2 | 38.6 | 34.985 |
| Cs$_2$O | | | | | | | | | 16.7 | — | — | — | — | — |
| HgO | | | | | | | | | — | 16.7 | 23.1 | — | — | — |
| Tl$_2$O | | | | | | | | | — | — | — | 16.7 | — | — |
| In$_2$O | | | | | | | | | — | — | — | — | 10.5 | — |
| Cl | | | | | | | | | — | — | — | — | — | 0.042 |

Table II records the annealing point (Ann. Pt.), strain point (Str. Pt.), coefficient of thermal expansion (Coef. Exp.) over the range of 25°–200° C. in terms of $\times 10^{-7}/°C$., and refractive index (R.I.) determined on several of the exemplary compositions of Table I utilizing measuring techniques conventional in the glass art.

TABLE II

| | 2 | 6 | 21 | 37 | 38 | 39 | 40 | 41 |
|---|---|---|---|---|---|---|---|---|
| Ann. Pt. | 375° C. | 383° C. | — | — | — | — | — | — |
| Str. Pt. | 351° C. | 360° C. | — | — | — | — | — | — |
| Coef. Exp. | 87.6 | 83.5 | 111.3 | — | — | — | — | — |
| R.I. | 2.43 | 2.21 | 2.39 | 2.27 | 2.45 | 2.53 | 2.35 | 2.31 |

Figure 1:
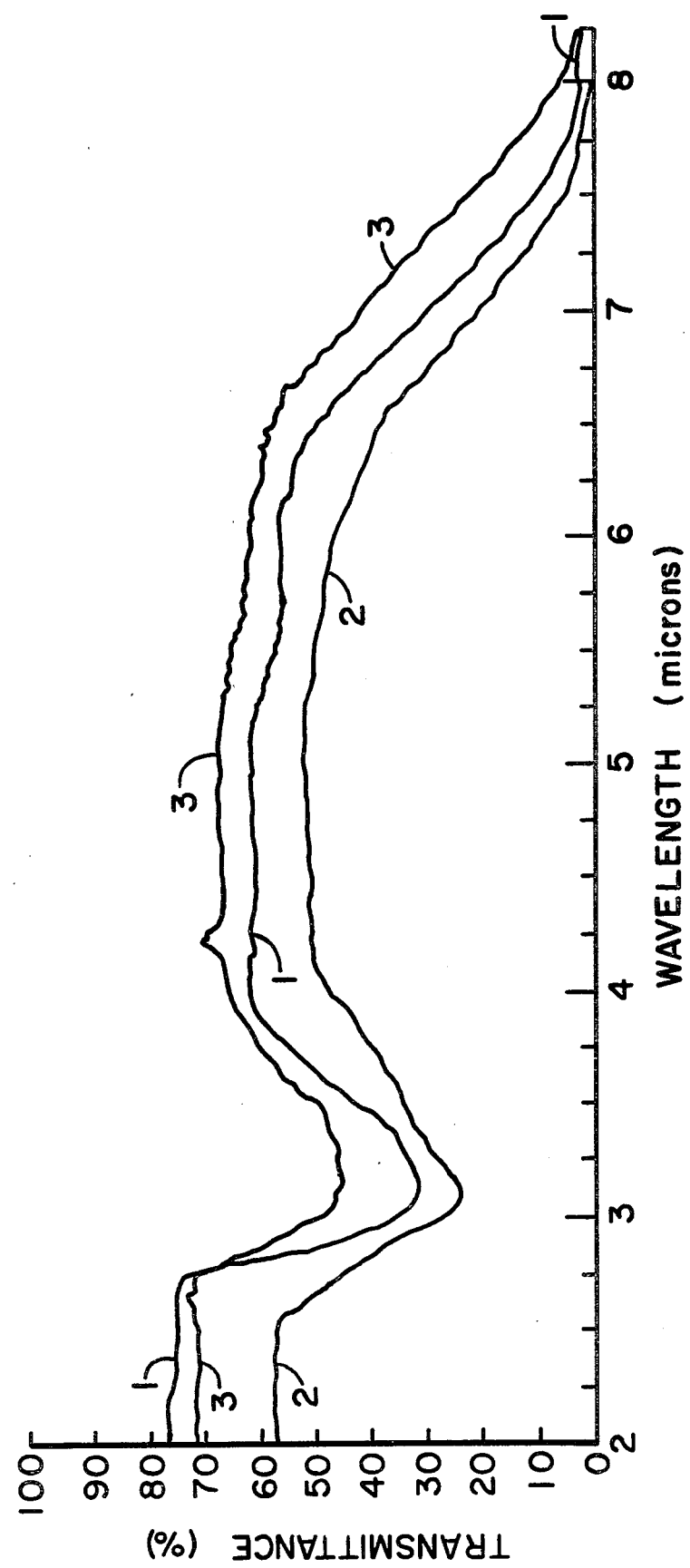
FIG. 1 depicts infrared transmittance curves demonstrated by operable inventive compositions over the range of about 2–8 microns.

FIG. 1 sets out infrared transmittance curves exhibited by Examples 2, 10, and 42. Curve 1 represents Example 2, a binary PbO—Ga$_2$O$_3$ composition; Curve 2 designates Example 10, a ternary PbO—Ga$_2$O$_3$—Bi$_2$O$_3$ composition; and Curve 3 illustrates the marked effect which the removal of water from the glass can have upon the infrared transmission of the glass. Example 42 represents Example 10 to which chloride was added. As is evident from Curve 3, an essentially totally dry glass would display transmittances in excess of 60% out to wavelengths of 6.5 microns and beyond.

Example 10 demonstrated exceptionally good glass quality and so was selected for further examination. To undertake such examination, a batch appropriate to yield 500 grams of glass was compounded, ballmilled and melted in platinum crucibles in like manner to the description above. The melt was cast into a graphite mold preheated to 350° C. to produce a rectangular slab having dimensions of about 7.5 cm $\times$ 3 cm $\times$ 1.3 cm and this slab annealed at 350° C. The resulting body exhibited a coefficient of thermal expansion (25°–200° C.) of $111.6 \times 10^{-7}/°C$., an annealing point of 319° C., a strain point of 297° C., and a refractive index of $2.46 \pm 0.05$.

We claim:

1. A stable binary glass exhibiting refractive indices greater than 2.4 and infrared transmitting characteristics out to wavelengths of 8 microns consisting, expressed in terms of weight percent on the oxide basis, of about 15–28% Ga$_2$O$_3$ and 72–85% PbO.

2. A stable ternary glass exhibiting infrared transmitting characteristics out to 8 microns consisting essentially, expressed in terms of weight percent on the oxide basis, as included within the area generally encompassed by the curve in FIG. 2 of about 10–85% PbO, 5–30% Ga$_2$O$_3$, and including Bi$_2$O$_3$ in amounts not more than 85%.

3. An infrared transmitting glass according to claim 2 also containing up to 30% total of the following components in the indicated proportions selected from the group of:

| | | | |
|---|---|---|---|
| $Cs_2O$ | 0–20 | $Rb_2O$ | 0–5 |
| $HgO$ | 0–30 | $HfO_2$ | 0–5 |
| $Tl_2O_3$ | 0–20 | $Al_2O_3$ | 0–3 |
| $Sb_2O_3$ | 0–10 | $ZnO$ | 0–5 |
| $TeO_2$ | 0–10 | $K_2O$ | 0–2 |
| $Cr_2O_3$ | 0–5 | $In_2O_3$ | 0–10 |
| $MnO_2$ | 0–5 | $SiO_2$ | 0–2 |
| $CuO$ | 0–2 | $ZrO_2$ | 0–5 |
| $CdO$ | 0–12 | $Nb_2O_5$ | 0–5 |
| $GeO_2$ | 0–5 | $Ta_2O_5$ | 0–5 |
| $Na_2O$ | 0–2 | Halogen | 0–5 |

4. An infrared transmitting glass according to claim 3 wherein said halogen is chloride.

* * * * *